(12) United States Patent
Kim et al.

(10) Patent No.: US 9,851,857 B2
(45) Date of Patent: Dec. 26, 2017

(54) TACTUAL SENSOR USING MICRO LIQUID METAL DROPLET

(71) Applicant: POSTECH ACADEMY-INDUSTRY FOUNDATION, Pohang (KR)

(72) Inventors: Joonwon Kim, Pohang (KR); Wan Kyun Chung, Pohang (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 50 days.

(21) Appl. No.: 14/917,995

(22) PCT Filed: Aug. 21, 2014

(86) PCT No.: PCT/KR2014/007776
§ 371 (c)(1),
(2) Date: Mar. 10, 2016

(87) PCT Pub. No.: WO2015/037837
PCT Pub. Date: Mar. 19, 2015

(65) Prior Publication Data
US 2016/0224152 A1  Aug. 4, 2016

(30) Foreign Application Priority Data

Sep. 11, 2013 (KR) .................. 10-2013-0109254

(51) Int. Cl.
*G01L 1/14* (2006.01)
*G01L 5/00* (2006.01)
(Continued)

(52) U.S. Cl.
CPC .............. *G06F 3/044* (2013.01); *G01L 1/146* (2013.01); *G01L 9/0072* (2013.01); *G06F 2203/04103* (2013.01)

(58) Field of Classification Search
CPC ... G01L 1/00; G01L 1/14; G01L 1/146; G01L 5/00; G01L 9/0072; G01L 9/12; G06F 3/044; G06F 2203/04103
See application file for complete search history.

(56) References Cited

U.S. PATENT DOCUMENTS 4,875,378 A   10/1989  Yamazaki
6,122,972 A *  9/2000  Crider .................. G01L 9/0072
                                                  361/283.4

(Continued)

FOREIGN PATENT DOCUMENTS

JP        06-008762        2/1994
JP        2005-207993      8/2005
KR    10-2013-0048216      5/2013

*Primary Examiner* — Nguyen Ha
(74) *Attorney, Agent, or Firm* — Lex IP Meister, PLLC

(57) ABSTRACT

The present invention provides a tactual sensor using a micro liquid metal droplet simultaneously having high sensitivity and good spatial resolution. A tactual sensor using a micro liquid metal droplet according to an exemplary embodiment of the present invention includes: a first film having a first electrode layer; a second film having a second electrode layer facing toward the first electrode layer; an insulating layer provided on the second film while covering the second electrode layer; and a main body disposed between the first electrode layer and the insulating layer to form a chamber corresponding to the first electrode layer and the second electrode layer and accommodating a micro liquid metal droplet in the chamber.

9 Claims, 9 Drawing Sheets

(51) Int. Cl.
*G01L 9/12* (2006.01)
*G06F 3/044* (2006.01)
*G01L 9/00* (2006.01)

(56) References Cited

U.S. PATENT DOCUMENTS

2007/0125178 A1* 6/2007 Rosenau .............. G01L 9/0095
    73/724
2014/0174189 A1* 6/2014 Pan ..................... G01L 9/0072
    73/724

* cited by examiner

TACTUAL SENSOR USING MICRO LIQUID METAL DROPLET

BACKGROUND OF THE INVENTION (a) Field of the Invention

The present invention relates to a tactual sensor. More particularly, the present invention relates to a tactual sensor using a micro liquid metal droplet.

(b) Description of the Related Art

As an example of a conventional tactual sensor, there is a capacitive tactual sensor. Referring to FIG. 1, the capacitive tactual sensor includes an upper film 2 attached with an upper electrode layer 1 as a portion to be contacted, a lower film 4 attached with a lower electrode layer 3, and an insulating layer 5 provided between the upper electrode layer 1 and the lower electrode layer 3 to separate the contact of the two electrode layers 1 and 3.

As shown in FIG. 2, if a touch force F acts upon the upper film 2, a distance between the two electrode layers 1 and 3 is changed and a capacitance generated between two electrode layers 1 and 3 due to a change of distance therebetween is measured.

However, if the distance between the two electrode layers 1 and 3 is more than 100 μm, the amount of the measured capacitance is very small. Also, since the distance forming a space filled with an air must be maintained to be very small between the two electrode layers 1 and 3, a bending range of the upper film 2 is very small. That is, the capacitive tactual sensor has a very low sensitivity.

Accordingly, the conventional capacitive tactual sensor is suitable for simply determining the contact existence of the portion to be contacted rather than measuring the touch force F acting upon the upper film 2 as the portion to be contacted.

To solve this problem, there is a method of manufacturing a tactual sensor by stacking the capacitive tactual sensor in multiple layers. However, the method of stacking the multiple layers complicates the manufacturing process of the capacitive tactual sensor and deteriorates the manufacturing efficiency.

As another example of the tactual sensor, there is a tactual sensor manufactured by a method of injecting a liquid metal into a micro channel. Since the tactual sensor has a wide cell area, spatial resolution is low, and as the measuring principle is the same as the conventional capacitive tactual sensor, the sensitivity is low and the tactual sensor is not suitable for precision measurement.

SUMMARY OF THE INVENTION

The present invention provides a tactual sensor using a micro liquid metal droplet to simultaneously have high sensitivity and good spatial resolution.

Further, the present invention provides a tactual sensor using a micro liquid metal droplet that is useful in the long term by using a liquid metal to which fatigue is not applied even with repeated action of the touch force.

A tactual sensor using a micro liquid metal droplet according to an exemplary embodiment of the present invention includes: a first film having a first electrode layer; a second film having a second electrode layer facing toward the first electrode layer; an insulating layer provided on the second film while covering the second electrode layer; and a main body disposed between the first electrode layer and the insulating layer to form a chamber corresponding to the first electrode layer and the second electrode layer and accommodating a micro liquid metal droplet in the chamber.

The main body may include multiple chambers, and the first electrode layer and the second electrode layer may face each other corresponding to each chamber.

Multiple first electrode layers may be disposed along a first direction to form a connected first electrode line, and multiple first electrode lines may be disposed along a second direction crossing the first direction.

Multiple second electrode layers may be disposed along the second direction to form a connected second electrode line, and multiple second electrode lines may be disposed in the first direction crossing the second direction.

The chamber may be disposed corresponding to a plurality of cross points where the first electrode line and the second electrode line cross.

The chamber may form a vertical inner wall that is perpendicular with respect to a plane of the main body.

The chamber may form an inclination inner wall that is inclined with respect to a plane of the main body.

The micro liquid metal droplet may be formed as a sphere that contacts an inner wall of the chamber, the insulating layer, and the first electrode layer.

The micro liquid metal droplet may be formed of mercury, and the diameter of the micro liquid metal droplet may be in a range from 50 μm to 2 mm.

The first film may be formed of PDMS (polydimethylsiloxane), and the thickness of the first film may be in a range from 50 μm to 1 mm.

According to an exemplary embodiment of the present invention, by providing the micro liquid metal droplet in the chamber between the first and second electrode layers provided in the first and second films, since the micro liquid metal droplet is deformed by the touch force acting on the first film, the capacitance generated in the contact area of the micro liquid metal droplet and the second electrode layer disposed via the insulating layer interposed therebetween may be measured, thereby having high sensitivity.

Further, in an exemplary embodiment of the present invention, by providing the chamber at the position where the first electrode line of the first electrode layer and the second electrode line of the second electrode layer are crossed, the size of the touch force acting on the first film and the position of the contact portion are recognized, and since the micro liquid metal droplet is accommodated within the chamber disposed with a matrix structure, high spatial resolution may be obtained.

In addition, in an exemplary embodiment of the present invention, the diameter of the micro liquid metal droplet and the thickness of the first film may be controlled such that the sensitivity may be further controlled.

DETAILED DESCRIPTION OF THE EMBODIMENTS

Figure 1:
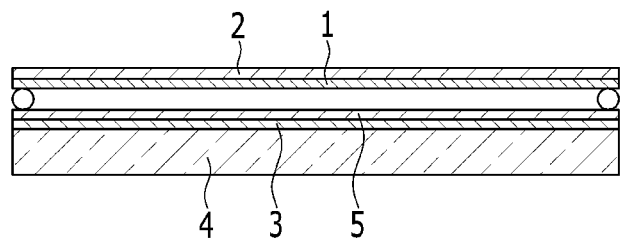
FIG. 1 is a cross-sectional view of a tactual sensor according to a conventional art.
Figure 2:
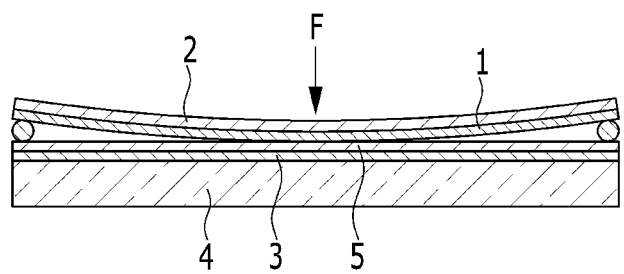
FIG. 2 is a cross-sectional view of a state that a touch force acts on the tactual sensor of FIG. 1.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 3:
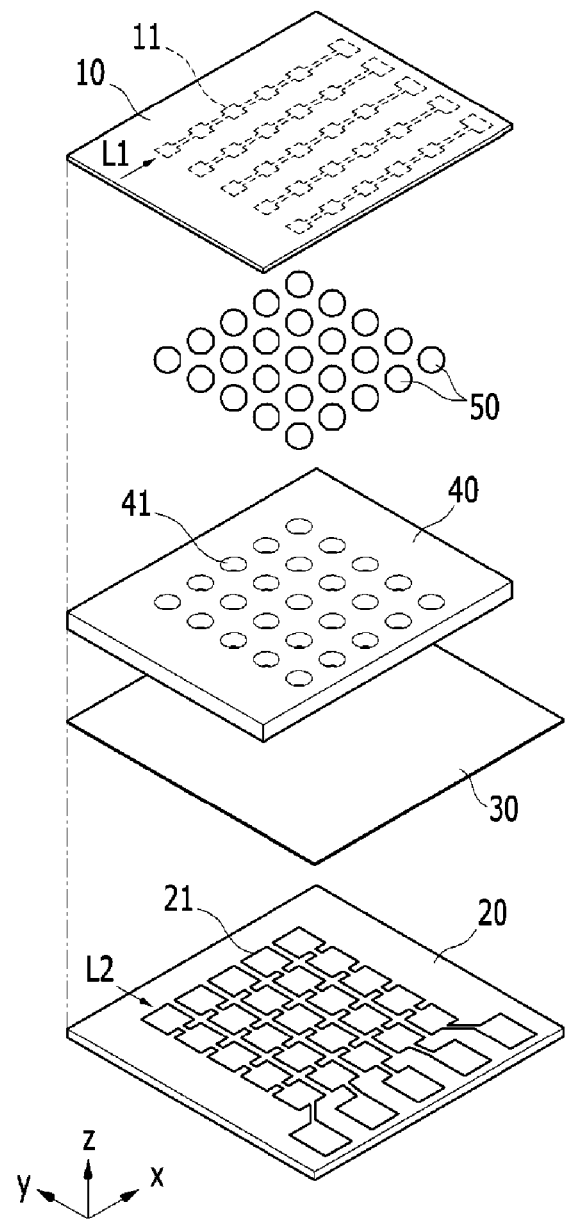
FIG. 3 is an exploded perspective view of a tactual sensor using a micro liquid metal droplet according to a first exemplary embodiment of the present invention.
Figure 4:
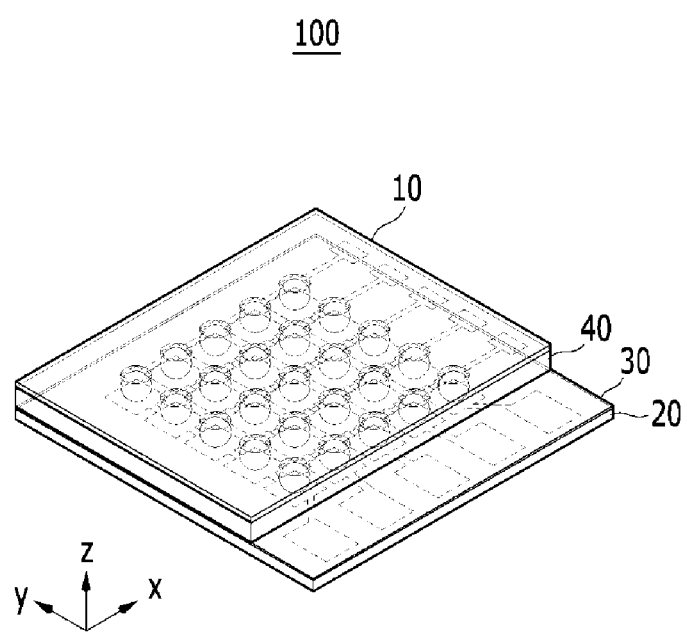
FIG. 4 is a coupling perspective view of the tactual sensor using the micro liquid metal droplet of FIG. 3.

FIG. 3 is an exploded perspective view of a tactual sensor using a micro liquid metal droplet according to a first exemplary embodiment of the present invention, and FIG. 4 is a coupling perspective view of the tactual sensor using the micro liquid metal droplet of FIG. 3.

Referring to FIG. 3 and FIG. 4, the tactual sensor 100 using the micro liquid metal droplet according to the first exemplary embodiment includes a first film 10 (hereinafter referred to as "an upper film"), a second film 20 (hereinafter referred to as "a lower film"), an insulating layer 30, a main body 40, and a micro liquid metal droplet 50.

The first film 10 forms a portion to be contacted, and includes a first electrode layer 11 made of an electrically conductive material on an inner surface thereof. The second film 20 faces toward the first electrode layer 11, and includes a second electrode layer 21 made of the electrically conductive material. The insulating layer 30 is provided on the second film 20 while covering the second electrode layer 21. The insulating layer 30 may be formed by attaching an insulating film or by coating an insulating material.

The main body 40 is disposed between the first film 10 and the second film 20, and in detail, between the first electrode layer 11 and the insulating layer 30, thereby providing a chamber 41 corresponding to the first electrode layer 11 and the second electrode layer 21. The chamber 41 receives the micro liquid metal droplet 50, and supports and limits the shape deformation of the micro liquid metal droplet 50 according to an action of the touch force F.

For example, the main body 40 has a plurality of penetration holes to provide a plurality of chambers 41, and the first electrode layer 11 and the second electrode layer 21 face each other corresponding to each of the penetration holes. Accordingly, the chamber 41 is set as the penetration hole formed in the main body 40 and the space between the first electrode layer 11 and the insulating layer 30. In each chamber 41, capacitance may be generated between the micro liquid metal droplet 50 and the second electrode layer 21 via the insulating layer 30 therebetween.

The micro liquid metal droplet 50 is accommodated in the chamber 41 to conduct to the first electrode layer 11 upward and to contact the insulating layer 30 downward. Since the thickness of the insulating layer 30 is generally fixed and it is deformed depending on the touch force F, the contact area of the micro liquid metal droplet 50 and the insulating layer 30 may increase or decrease. The capacitance generated between the micro liquid metal droplet 50 and the second electrode layer 21 is increased or decreased depending on the increase and decrease of the contact area.

That is, if the touch force F largely acts to the upper film 10 of the portion to be contacted such that the contact area between the micro liquid metal droplet 50 and the insulating layer 30 is increased, the capacitance is increased. If the touch force F acting on the upper film 10 is removed such that the contact area between the micro liquid metal droplet 50 and the insulating layer 30 is decreased, the capacitance is decreased.

On the other hand, the first electrode layer 11 is disposed along a first direction (x-axis direction) in plural to form a connected first electrode line L1. First electrode lines L1 are disposed in plural and are separated along a second direction (y-axis direction) crossing the first direction (x-axis direction).

The second electrode layer 21 is disposed in plural along the second direction (y-axis direction) to form a connected second electrode line L2. Second electrode lines L2 disposed in plural are separated along the first direction (x-axis direction) crossing the second direction (y-axis direction).

The chambers 41 are disposed corresponding to the plurality of cross points where the first electrode lines L1 of the first electrode layers 11 and the second electrode lines L2 of the second electrode layers 21 cross. That is, the chambers 41 form a matrix structure in the main body 40 and narrowly form the area of the contacted unit cell. Accordingly, the spatial resolution of the tactual sensor 100 is increased.

That is, the matrix structure of the cross points of the first electrode lines L1 and the second electrode lines L2 corresponds to the matrix structure of the chambers 41. Accordingly, the position of the contact portion in the tactual sensor 100 is recognized by the capacitance measured in the first electrode lines L1 and the second electrode lines L2.

Figure 5:
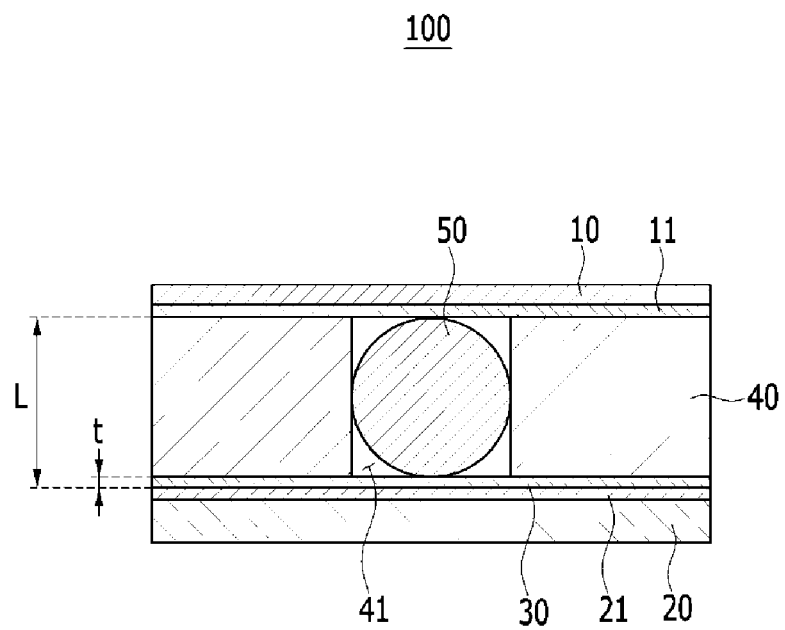
FIG. 5 is a state diagram showing a shape of a micro liquid metal droplet in a state that a touch force is not applied to an upper film.
Figure 6:
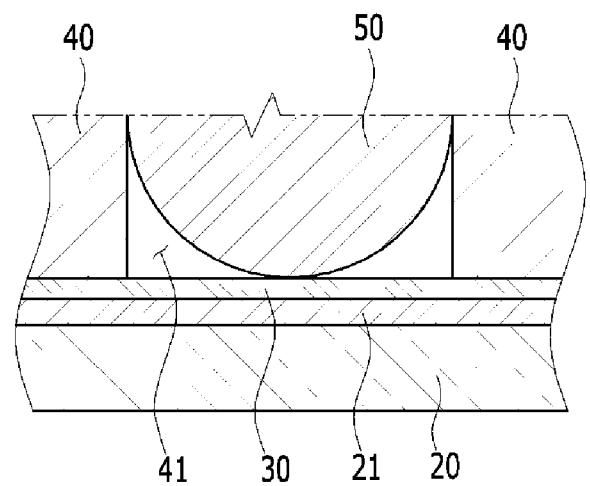
FIG. 6 is a state diagram of sensing a capacitance by using a micro liquid metal droplet in the state of FIG. 5.

FIG. 5 is a state diagram showing a shape of a micro liquid metal droplet in a state that a touch force is not applied to an upper film, and FIG. 6 is a state diagram of sensing a capacitance by using a micro liquid metal droplet in the state of FIG. 5.

Referring to FIG. 5 and FIG. 6, the chamber 41 forms a vertical inner wall perpendicular to the plane of the main body 40. Accordingly, the micro liquid metal droplet 50 is accommodated in the predetermined space set by the inner wall of the chamber 41, the insulating layer 30, and the first electrode layer 11.

The micro liquid metal droplet 50 maintains a spherical shape of the liquid at room temperature while being a metal having electrical conductivity. For example, the micro liquid metal droplet 50 may be made of mercury. The diameter of the micro liquid metal droplet 50 may be in a range from 50 μm to 2 mm, and the chamber 41 is formed of the space corresponding to the micro liquid metal droplet 50.

When the diameter of the micro liquid metal droplet 50 is less than 50 μm, the capacitance generated between the micro liquid metal droplet 50 and the second electrode layer 21 is slight such that it is difficult to confirm the tactility. When the diameter of the micro liquid metal droplet 50 is more than 2 mm, it is difficult for the micro liquid metal droplet 50 to maintain the spherical shape in the chamber 41 due to the limitation of the surface tension. That is, in the state that the touch force F does not act, the micro liquid metal droplet 50 may be contacted to the insulating layer 30 with the overly broad area.

Since the micro liquid metal droplet 50 has very high surface tension, in the initial condition that the touch force F does not act on the upper film 10 of the portion to be contacted, the micro liquid metal droplet 50 is maintained as an almost spherical liquid drop.

In the condition that the touch force F acts on the upper film 10 of the portion to be contacted, the micro liquid metal droplet 50 may be compressed while the volume of the chamber 41 accommodated by the micro liquid metal droplet 50 decreases. In this case, the contact area of the micro liquid metal droplet 50 and the insulating layer 30 increases.

That is, in the state that the micro liquid metal droplet 50 is accommodated in the chamber 41, before the touch force F acts on the upper film 10, the micro liquid metal droplet 50 is formed as the sphere, and the state that the micro liquid metal droplet 50 contacts the inner wall, the first electrode layer 11, and the insulating layer 30 is maintained.

In this case, the micro liquid metal droplet 50 maintains a point contact or a narrow surface contact with the first electrode layer 11 and the insulating layer 30. Accordingly, the predetermined minimum capacitance is generated in the micro liquid metal droplet 50 and the second electrode layer 11 disposed via the insulating layer 30.

Figure 7:
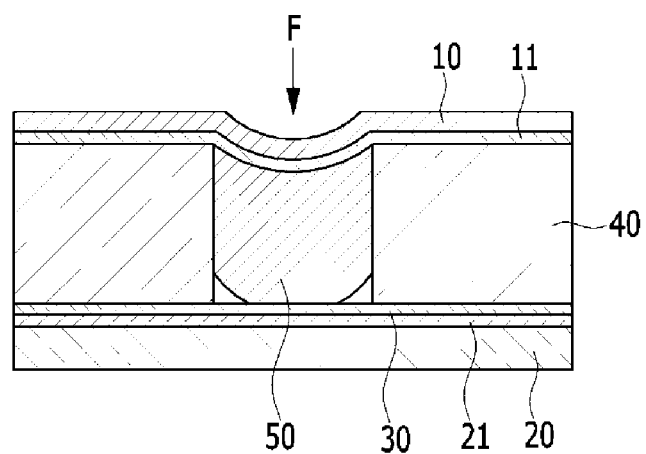
FIG. 7 is a state diagram showing a shape change of a micro liquid metal droplet in a state that a touch force acts on the upper film.
Figure 8:
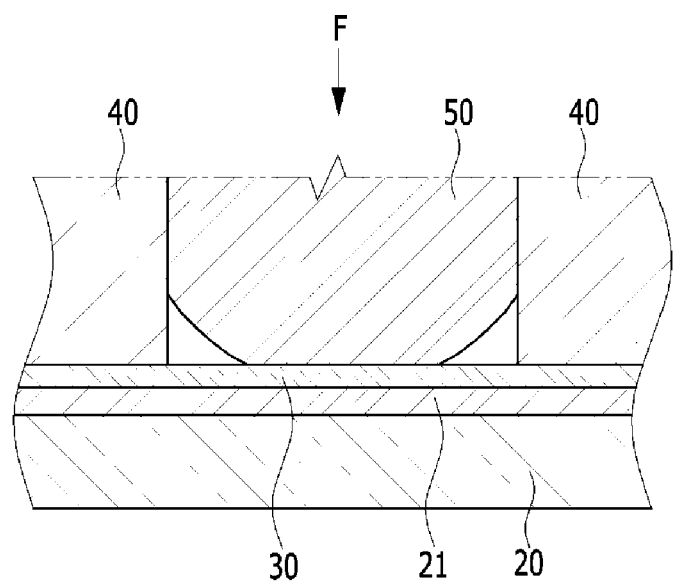
FIG. 8 is a state diagram of sensing a capacitance by using a micro liquid metal droplet in the state of FIG. 7.

FIG. 7 is a state diagram showing a shape change of a micro liquid metal droplet in a state that a touch force acts on the upper film, and FIG. 8 is a state diagram of sensing a capacitance by using a micro liquid metal droplet in the state of FIG. 7.

Referring to FIG. 7 and FIG. 8, if the touch force F acts on the upper film 10, the micro liquid metal droplet 50 is pressed by the first electrode layer 11 and is filled into the empty space within the chamber 41.

In this case, the micro liquid metal droplet 50 is changed into the surface contact state that is increased with the first electrode layer 11 and the insulating layer 30. Accordingly, capacitance corresponding to the increasing of the surface contact is generated between the micro liquid metal droplet 50 and the second electrode layer 11 disposed via the insulating layer 30.

The upper film 10 and the main body 40 that are deformed depending on the touch force F are formed of the material having the flexibility and the electrical insulation quality. By the flexibility, the molding of the upper film 10 and the main body 40 is easy.

For example, the upper film 10 may be formed of PDMS (polydimethylsiloxane). In this case, the thickness of the upper film 10 may be in the range from 50 μm to 1 mm. When the thickness of the upper film 10 is less than 50 μm, the upper film 10 is apt to be easily broken even if the minimal touch force F acts. When the thickness of the upper film 10 is over 1 mm, the flexibility of the upper film 10 is deteriorated such that the touch force F is difficult to be transmitted to the micro liquid metal droplet 50. That is, the tactual sensor 100 does not detect the weak touch force F.

The first and second electrode layers 11 and 21 are adhered to the upper and lower films 10 and 20, respectively, however they may be respectively formed on the upper and lower films 10 and 20 by a deposition method. The first and second electrode layers 11 and 21 may be deformed depending on the measuring method of the tactual sensor 100, the circuit structure, the area to be measured, etc.

As described above, the tactual sensor 100 uses the micro liquid metal droplet 50 that is compressed inside the chamber 41, and the micro liquid metal droplet 50 does not receive the fatigue such that the tactual sensor 100 may be used for a long term in an environment where it repeatedly receives the touch force F.

On the other hand, in the tactual sensor 100 of the first exemplary embodiment, based on one cell of the tactual sensor 100, when applying a vibration (the touch force F) of a frequency that is smaller than a frequency applied to the circuit driving the tactual sensor 100 to the upper film 10 of the portion to be contacted, the tactual sensor 100 may measure the vibration.

Further, in the state that a touch force F is not applied to the upper film 10 of the portion to be contacted of the tactual sensor 100, if the temperature of the tactual sensor 100 is changed, the volume of the micro liquid metal droplet 50 may be changed by an influence of a thermal expansion coefficient.

In this case, since the volume of the micro liquid metal droplet 50 is changed within the chamber 41 of a limited space, the contact area is changed between the micro liquid metal droplet 50 and the inner wall of the chamber 41.

Accordingly, since the contact area of the micro liquid metal droplet 50 for the insulating layer 30 is changed, the capacitance formed between the micro liquid metal droplet 50 and the second electrode layer 21 is changed. By using this, the tactual sensor 100 may detect the change of the temperature.

Next, various exemplary embodiments of the present invention will be described. Descriptions of the same elements as in the first exemplary embodiment are omitted and differences will be described.

Figure 9:
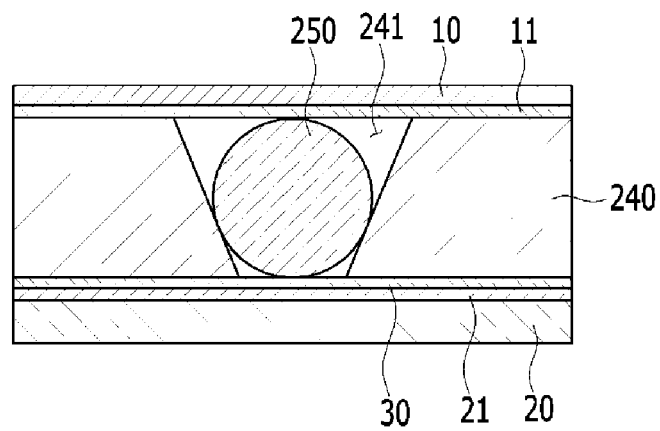
FIG. 9 is a cross-sectional view of a tactual sensor using a micro liquid metal droplet according to a second exemplary embodiment of the present invention.

FIG. 9 is a cross-sectional view of a tactual sensor using a micro liquid metal droplet according to a second exemplary embodiment of the present invention. Referring to FIG. 9, in the tactual sensor 200 of the second exemplary embodiment, the chamber 241 has an inclination inner wall that is inclined with respect to the plane of the main body 240.

That is, the chamber 241 is formed by widening the penetration hole having the inclination inner wall at the side of the first electrode layer 11 and narrowing the penetration hole at the side of the second electrode layer 21. Accordingly, the chamber 241 may guiding the micro liquid metal droplet 250 to the center portion along the inclined inner wall of the chamber 241.

In the tactual sensor, even if the same touch force is applied to the upper film depending on the position of the micro liquid metal droplet accommodated to the chamber, the sensitivity may be changed. However, in the second exemplary embodiment, the chamber 241 positions the micro liquid metal droplet 250 at the center of the chamber 241 such that further accurate measuring may be realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, by providing the micro liquid metal droplet in the chamber between the first and second electrode layers provided in the first and second films, since the micro liquid metal droplet is deformed by the touch force acting on the first film, the capacitance generated in the contact area of the micro liquid metal droplet and the second electrode layer disposed via the insulating layer interposed therebetween may be measured, thereby having the high sensitivity.

Further, in an exemplary embodiment of the present invention, by providing the chamber at the position where the first electrode line of the first electrode layer and the second electrode line of the second electrode layer are crossed, the size of the touch force acting on the first film and the position of the contact portion are recognized, and since the micro liquid metal droplet is accommodated within the chamber disposed with the matrix structure, high spatial resolution may be obtained.

In addition, in an exemplary embodiment of the present invention, the diameter of the micro liquid metal droplet and the thickness of the first film may be controlled such that the sensitivity may be further controlled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

- Description of Reference Numerals Indicating Primary Elements in the Drawings -

| | |
|---|---|
| 10: first film (upper film) | 11: first electrode layer |
| 20: second film (lower film) | 21: second electrode layer |
| 30: insulating layer | 40, 240: main body |
| 41, 241: chamber | 50, 250: micro liquid metal droplet |
| 100, 200: tactual sensor | F: touch force |
| L1: first electrode line | L2: second electrode line |

What is claimed is:

1. A tactual sensor using a micro liquid metal droplet, comprising:
   a first film having a first electrode layer;
   a second film having a second electrode layer facing toward the first electrode layer;
   an insulating layer provided on the second film while covering the second electrode layer; and
   a main body disposed between the first electrode layer and the insulating layer to form a chamber corresponding to the first electrode layer and the second electrode layer and accommodating a micro liquid metal droplet in the chamber,
   wherein
   the main body includes multiple chambers, and
   the first electrode layer and the second electrode layer face each other corresponding to each chamber.

2. The tactual sensor of claim 1, wherein
   the first electrode layer is disposed along a first direction in plural to form a connected first electrode line, and the first electrode line is disposed in plural and separated along a second direction crossing the first direction.

3. The tactual sensor of claim 2, wherein
   the second electrode layer is disposed along the second direction in plural to form a connected second electrode line, and the second electrode line is disposed in plural and separated along the first direction crossing the second direction.

4. The tactual sensor of claim 3, wherein
   the chamber is disposed corresponding to a plurality of cross points where the first electrode lines and the second electrode lines cross.

5. The tactual sensor of claim 1, wherein
   the chamber forms a vertical inner wall that is perpendicular with respect to a plane of the main body.

6. The tactual sensor of claim 1, wherein
   the chamber forms an inclination inner wall that is inclined with respect to a plane of the main body.

7. A tactual sensor using a micro liquid metal droplet, comprising:
   a first film having a first electrode layer;
   a second film having a second electrode layer facing toward the first electrode layer;
   an insulating layer provided on the second film while covering the second electrode layer; and
   a main body disposed between the first electrode layer and the insulating layer to form a chamber corresponding to the first electrode layer and the second electrode layer and accommodating a micro liquid metal droplet in the chamber, wherein
   the micro liquid metal droplet is formed as a sphere that contacts an inner wall of the chamber, the insulating layer, and the first electrode layer.

8. The tactual sensor of claim 7, wherein
   the micro liquid metal droplet is formed of mercury, and
   the diameter of the micro liquid metal droplet is in a range from 50 μm to 2 mm.

9. A tactual sensor using a micro liquid metal droplet, comprising:
   a first film having a first electrode layer;
   a second film having a second electrode layer facing toward the first electrode layer;
   an insulating layer provided on the second film while covering the second electrode layer; and
   a main body disposed between the first electrode layer and the insulating layer to form a chamber corresponding to the first electrode layer and the second electrode layer and accommodating a micro liquid metal droplet in the chamber, wherein
   the first film is formed of PDMS (polydimethylsiloxane), and
   the thickness of the first film is in a range from 50 μm to 1 mm.

* * * * *